(12) United States Patent
Brod

(10) Patent No.: US 8,348,170 B2
(45) Date of Patent: Jan. 8, 2013

(54) METHOD FOR PRODUCING AN ANTENNA ON A SUBSTRATE

(75) Inventor: Volker Brod, Bad Abbach (DE)

(73) Assignee: Mühlbauer AG, Roding (DE)

( * ) Notice: Subject to any disclaimer, the term of this patent is extended or adjusted under 35 U.S.C. 154(b) by 345 days.

(21) Appl. No.: 12/691,287

(22) Filed: Jan. 21, 2010

(65) Prior Publication Data

US 2010/0181385 A1   Jul. 22, 2010

(30) Foreign Application Priority Data

Jan. 21, 2009   (DE) .................. 10 2009 005 570

(51) Int. Cl.
 *G06K 19/06*   (2006.01)
(52) U.S. Cl. ........................................ 235/492
(58) Field of Classification Search .................. 235/492, 235/487; 340/572.7, 572.8; 343/700 R, 343/700 MS
 See application file for complete search history.

(56) References Cited

U.S. PATENT DOCUMENTS

| | | | |
|---|---|---|---|
| 5,608,417 A * | 3/1997 | de Vall ........................ | 343/895 |
| 6,023,837 A | 2/2000 | Finn | |
| 6,233,818 B1 | 5/2001 | Finn et al. | |
| 6,786,419 B2 * | 9/2004 | Kayanakis .................... | 235/492 |
| 7,598,873 B2 * | 10/2009 | Yamagajo et al. ......... | 340/572.7 |
| 2002/0016349 A1 | 2/2002 | Heywang et al. | |
| 2008/0246664 A1 * | 10/2008 | Ikemoto et al. ........ | 343/700 MS |
| 2010/0032199 A1 * | 2/2010 | Bentley ........................ | 174/261 |

FOREIGN PATENT DOCUMENTS

| | | |
|---|---|---|
| DE | 43 25 334 A1 | 12/1994 |
| DE | 44 10 732 C2 | 10/1995 |
| DE | 196 20 242 A1 | 11/1997 |
| DE | 198 11578 A1 | 10/1999 |
| DE | 199 05 886 A1 | 8/2000 |
| DE | 199 34 789 C1 | 5/2001 |
| DE | 102 49 198 A1 | 5/2004 |
| EP | 0704 928 A2 | 4/1996 |
| EP | 0 768 620 B1 | 4/1997 |
| FR | 2 801 728 A1 | 11/1999 |

* cited by examiner

*Primary Examiner* — Seung Lee
(74) *Attorney, Agent, or Firm* — Henry M. Feiereisen LLC

(57) ABSTRACT

A simple and universal technique for fabricating different antenna structures, in particular a multilayer antenna structure, on a substrate is disclosed. Before the antenna is actually fabricated or placed on the substrate, connecting surfaces for connecting an antenna conductor and/or a chip or a chip module as well as through-platings extending through the antenna substrate are prepared between the connecting surfaces.

10 Claims, 3 Drawing Sheets

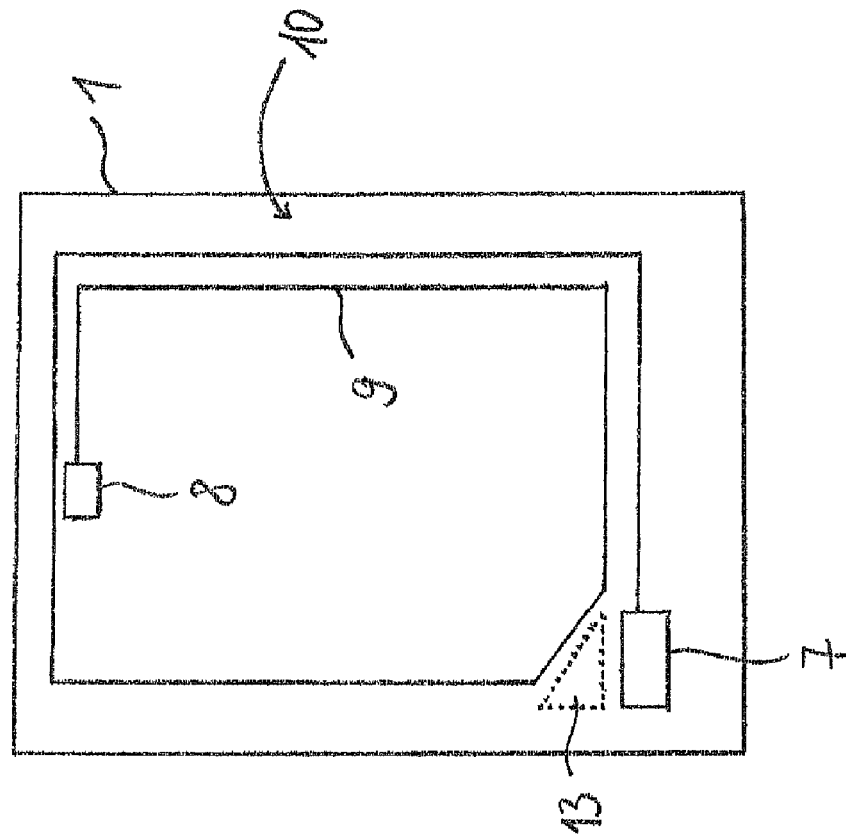
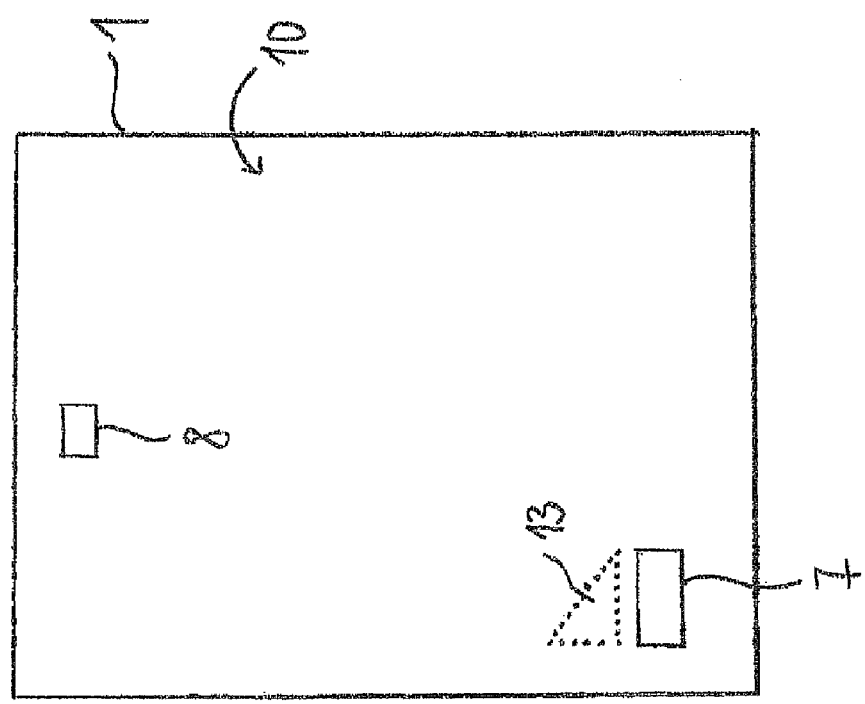

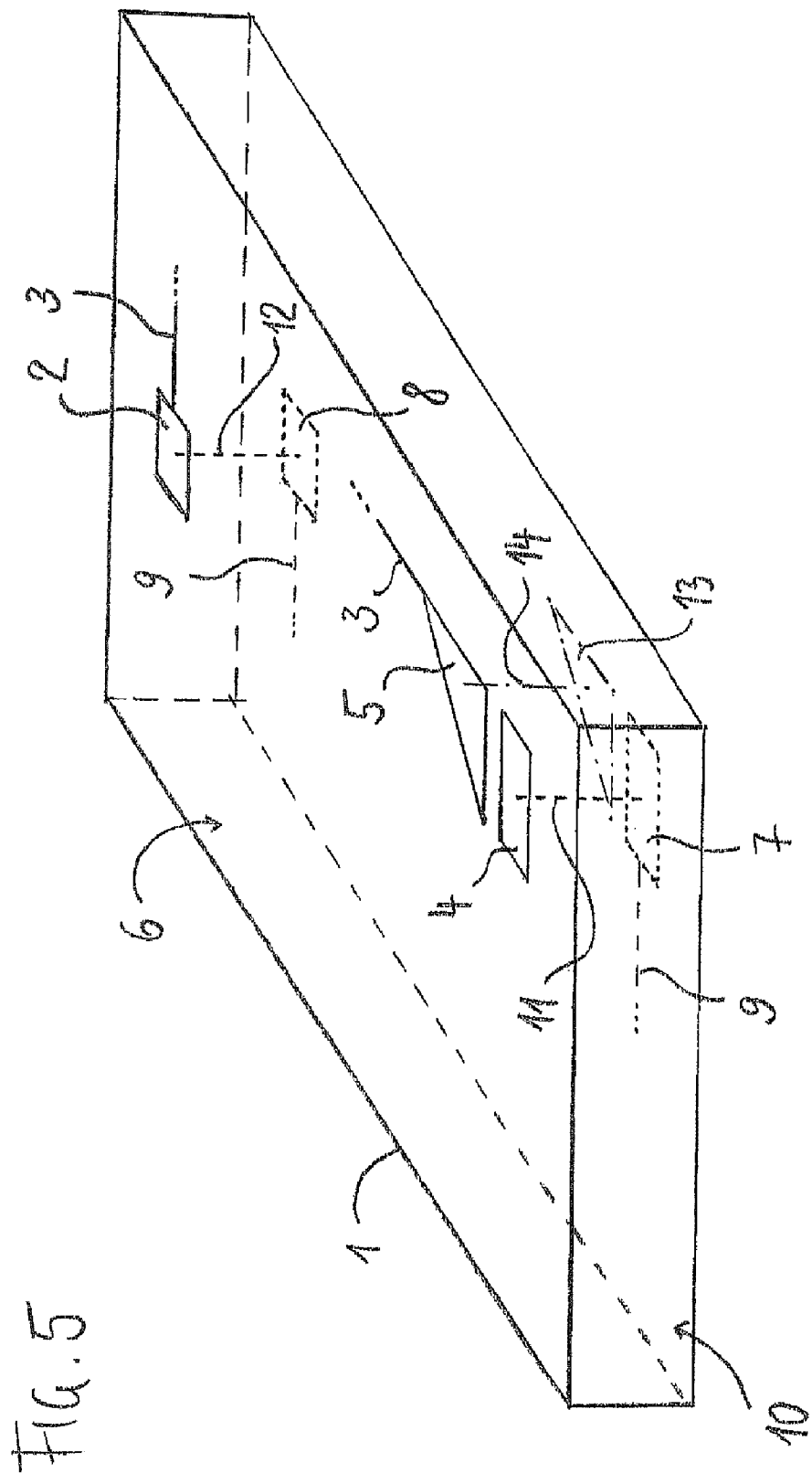

METHOD FOR PRODUCING AN ANTENNA ON A SUBSTRATE

CROSS-REFERENCES TO RELATED APPLICATIONS

This application claims the priority of German Patent Application, Serial No. 10 2009 005 570.3, filed Jan. 21, 2009, pursuant to 35 U.S.C. 119(a)-(d), the content of which is incorporated herein by reference in its entirety as if fully set forth herein.

BACKGROUND OF THE INVENTION

The present invention relates to a method for producing an antenna on a substrate, in particular in plastic substrate, for combination with a chip or a chip module to produce a transponder. In addition, the invention relates to a device with such transponder.

The following discussion of related art is provided to assist the reader in understanding the advantages of the invention, and is not to be construed as an admission that this related art is prior art to this invention.

A transponder is a device for wireless communication, which receives incoming signals and responds automatically. The chip or chip module may be an RFID (Radio Frequency Identification) chip or an RFID chip module. RFID transponders are typically placed on plastic substrates and are further processed as so-called RFID inlays (e.g., RFID units) and the like in contactless cards, e-passports, smart labels and the like. The RFID transponder is hereby used, for example, to identify persons and objects.

In RFID applications relating to people, the RFID chips are provided with special controllers and larger data memories as well as security functions, for example for storing biometric data or for encryption of data for data transmission. These types of RFID chips therefore have a larger size than, for example, RFID chips which are only used to identify products. In the latter, a so-called EPC (Electronic Product Code) number is basically sufficient. Moreover, less memory is required in this case, reducing the size of the silicon chips.

The present description generally uses the term "chip". This term designates, unless explicitly mentioned otherwise, both silicon chips without a housing ("bare dice") and chip modules, wherein the chip modules may include both chips with metal substrates (metal lead frames) as well as chips with polymer substrates (so-called "straps" or "interposer"). The term "chip" indicates generally an electronic component having at least one integrated electronic circuit.

Different process and fabrication techniques are used to produce RFID transponder inlays for different applications.

For example, low-cost RFID transponder inlays are produced using the so-called flip chip process. An RFID chip is hereby mounted directly on an antenna arranged on a substrate, wherein the antenna can be made of different materials, for example copper, aluminum or conducting silver paste. The antenna and the chip, which has so-called bump terminals, are typically connected using a conductive adhesive. These adhesives are mostly anisotropic, epoxy-based adhesives (so-called ACP-adhesives) or a "hot melt" adhesive. For hardening the adhesives, the substrates must be designed to withstand temperatures reaching 200° C. for a duration of several seconds, which limits or makes it impossible the use of many substrate materials.

As an alternative to the flip chip method, RFID chip modules can also be connected to antennae arranged on the substrate by other methods. Depending on the materials used for the chip modules, the antenna substrates and the antenna metallizations, the RFID chip module and the antenna are electrically connected with an adhesive, by soldering, welding, or mechanical techniques, such as crimping, clinching, etc.

The antennae are typically made of electrically conducting materials, in particular metals, conductive pastes or conductive inks. For applications in the high-frequency (HF) range—which includes the standard frequency of 13.56 MHz used with RFID—the reading properties are predominantly determined by the ohmic resistance of the antenna. The cross-section of the electrical conductors of the windings in conjunction with the specific resistance of the applied material has a direct effect. For this reason, the antennae used in the present example of an RFID transponder are frequently foil antennae or wire antennae, whereby the foil antennae are preferably made of copper or aluminum and the wire antennae are preferably made of copper wire. The antennae are always applied on plastic substrates. The substrate material is normally PET (polyethylene terephthalate), PEN (polyethylene naphthalate), polyimide (PI, Kaptone®), PVC (polyvinylchloride) or PC (polycarbonate).

UHF antennae for RFID applications with reading ranges of up to several meters operate in the frequency range of about 860-960 MHz and are configured as a single-layer electric dipole, i.e., for example on one side of a foil substrate. The physical thickness is several micrometers.

HF antennae for RFID applications are more particularly employed with security applications due to the required limited writing and reading range (no more than 10 cm). HF antennae typically operate at 13.56 MHz. They are constructed as a coil which in an actual application exchanges data with a second coil in the reading device without making physical contact. The coil is therefore constructed on one side of a plastic substrate material. To allow connection of both ends of the coil to the RFID chip (e.g., a security controller chip), one end of the coil must be routed across the windings of the coil to the vicinity of the other coil end. This is done in different ways, depending on the employed antenna fabrication technique. For example, the wires of wire antennae are coated with an insulating layer. The wire can then be routed to the other wire end across the windings placed on the substrate, without causing a short circuit. In the flatter etching-based fabrication process, the antennae structures are made of a copper foil layer that was previously laminated across an area, similar to the fabrication of etched printed circuit boards. To bring one coil end into the vicinity of the other coil end, a so-called "bridge" is printed across the coil windings. An insulation layer must be printed underneath the "bridge" to prevent a short circuit. After etching, a residue from the adhesive used to laminate the copper foil typically remains on the antenna substrate. The possibility for laminating additional layers of the same material is then limited. This applies particularly to the expensive polycarbonate substrate materials required for secure applications.

For single-layer HF antennae fabricated by a printing method, the bridge technique is produced, as with the etching process, by forming an insulation layer between "bridge" and antenna windings. The wire antenna technique has dominated high-quality applications because these include additional material layers produced in the lamination process with the RFID inlay. The device is constructed conventionally in a single plane, i.e., the HF antenna coil is applied on one side of the plastic substrate and connected with the RFID chip. The side-by-side wires therefore result, by taking into account the employed wire thickness, a coil with a minimum coil width (about 4 to 6 windings, depending on the characteristic properties of the RFID chip) and a minimum thickness of the RFID inlay.

In all the aforementioned methods, the antennae are applied on the substrate separately from the RFID chip. The antenna and the RFID chip are electrically connected in a separate process step.

Disadvantageously, the aforementioned method requires different fabrication, assembly and connection techniques, depending on the employed substrate and antenna materials. More and more frequently, these techniques reach physical limits, when increased productivity is required, for example with respect to temperature loading and hardening duration with adhesives, etc. The stringent quality requirements with respect to reliability and product lifetime, for example during fabrication of RF transponders for identification of persons or contactless applications in financial transactions, therefore significantly limit the techniques and materials that can be used.

It would therefore be desirable and advantageous to provide an improved method for producing an antenna on a substrate, which obviates prior art shortcomings and is able to specifically provide a simple and universal technique for fabricating different types of antennae with a chip or a chip module for an RFID transponder.

SUMMARY OF THE INVENTION

According to one aspect of the invention, a method for producing an antenna on a substrate, in particular on a plastic substrate, for a transponder which includes the antenna and a chip or a chip module, includes a first process cycle with the steps of a) producing electrically conducting connecting surfaces for connecting an antenna conductor and/or a chip or chip module, wherein a plurality of connecting surfaces are produced on a first substrate surface and a plurality of connecting surfaces are produced on at least one second substrate surface that is not identical with the first substrate surface, and b) producing a plurality of electrically conducting connections between each of two or more on connecting surfaces arranged on a different substrate surfaces. The first process cycle is followed by a second process cycle which includes the additional steps of c) producing a first antenna section on the first substrate surface, d) producing at least one second antenna section on the at least one second substrate surface, e) connecting the first antenna section with at least two connecting surfaces arranged on the first substrate surface, and f) connecting to the second antenna section with at least two connecting surfaces arranged on the at least one second substrate surface.

The completed first and the second process cycles produce the antenna sections and connect the antenna sections with the connecting surfaces via the electrically conducting connections, thereby producing a complete antenna that is arranged in at least two non-identical planes and provided with connecting surfaces for connecting a chip or chip module.

According to another aspect of the invention, a device of the invention includes a transponder arranged on a substrate, in particular a plastic substrate, which includes a chip, in particular an RFID chip or an RFID chip module, and an antenna, wherein the antenna is produced by the aforedescribed method.

The term "chip" or "chip module" used herein indicates in particular an RFID chip and/or an RFID chip module. However, the invention is not limited to RFID chips or RFID chip modules, but can also be applied to other chips or chip modules, in particular chips or chip modules used for wireless communication or wireless data transmission.

The present invention is fundamentally suited for all types of chips and is also independent of the products where the finished transponders are used. The described fabrication of the transponder is particularly advantageous when the chips are RFID chips used for fabrication of RFID transponders. Such RFID transponders (RFID inlays, RFID inlets) are further processed, for example, into self-adhesive smart labels, RFID paper tickets or RFID plastic cards. The RFID transponders used in contactless plastic cards made of PVC or e-passport inlays made of polycarbonate are laminated, for example in the PVC card materials, forming an intermediate layer between the bottom and the top layer (made of PVC or polycarbonate).

The core idea of the invention is to provide a multilayer, in particular double-layer antenna, i.e., to make the antenna of several antenna sections which are disposed in non-identical planes.

A significantly higher parasitic winding capacitance can be attained in a multilayer, in particular double-layer antenna, through an arrangement of opposing windings. Due to the greater contribution from the parasitic windings capacitance to the overall capacitance of the RFID transponder, which is composed of the capacitance of the RFID chips, the parasitic winding capacitance and the ambient capacitance, a smaller number of windings can be used in the design of the antenna coil (inductance). With the greater contribution of the parasitic winding capacitance of the multi-layer antennae to the overall capacitance of an RFID transponder, "de-tuning" of the transponder center frequency through ambient effects is significantly reduced, which is advantageous for many applications. As a result, the effective reading range of a correspondingly constructed electronic passport or of a contactless card is significantly less sensitive to ambient effects, which results in a more stable and more secure operation of the RFID product.

The concept of using several layers is combined with the additional basic concept, to provide connecting surfaces for connecting an antenna conductor and/or a chip or a chip module as well as the required electrical connections (subsequently referred to in short as "through-platings") between the contact surfaces through the antenna substrate before the antenna is actually fabricated, i.e., for example, before coating of the substrate or placing antennae wire and the like. In this way, quite different antennae technologies can be used, without making it necessary to take into consideration the way the antenna sections are connected to form a complete antenna. The ends of the antenna sections are simply—in is suitable way depending on the fabrication technique—connected with the connecting surfaces. This applies analogously also to the subsequent connection of the chip ("bare die" or housed chip), which makes the entire process very universal. In other words, different antenna fabrication processes can be used, as required for the corresponding antenna or the corresponding transponder independent on the techniques used for producing the connecting surfaces and independent of the technique used for producing the through-platings. At the same time, the antenna fabrication method can be optimally matched to the employed substrate and antenna materials. The overall result is a very universal technique for producing different types of antennae on a substrate.

Advantageously, the expensive and complex fabrication of "bridges" is eliminated.

The invention has the advantage that the same substrate material can always be used regardless of the selected antenna fabrication method. For example, polycarbonate or PVC substrates can be used. In one particularly advantageous embodiment of the invention, the substrate is made of a polycarbonate material. This selected substrate material is optimally suited if a subsequent lamination is required.

In this way, a problem can be solved which occurs frequently in the context of fabrication of, for example, contactless ID cards or elements, for example a "holder page", of electronic passports. In these applications, the RFID inlays must be further processed with additional material layers into a composite. The RFID inlays are thereby protected against the environment and are not visible to the user, which can also be an advantageous security aspect. In addition, the generated surfaces of the additional material layers are, depending on the application, provided with certain information and/or security features. This can be implemented, for example, using printing, laser radiation, embossing, and the like. The requirements for the surfaces are very high. For example, color images to be applied for identity cards applications should not have quality differences because of different surface structures.

This means that further processing of the RFID inlays through lamination of additional material layers, for the fabrication of high-quality contactless cards or security products (e.g., electronic passports) has to meet stringent requirements. An important element is here the implementation and fabrication techniques of the employed antenna. The important features for an ideal antenna in an RFID inlay for high-quality applications are listed below. All requirements are met with the application of the present invention.

1) The antenna is applied on the same material from which the material layers are made that are later joined with the substrate by lamination. Polycarbonate (PC) has established itself as the material of choice for applications with contactless (RFID) security products.

2) The mechanical structure of the antenna is very stable (robust) in order to satisfy the long-term requirements with respect to mechanical stress (bending, torsion, etc.) and corrosion resistance, chemical decomposition, etc.

3) The antenna can be built very flat in order to configure the fabricated security products ergonomically, light weight and unobtrusive. This requirement is enhanced by the technical trend that the RFID chips become increasingly thinner for security applications so that the antenna techniques must be improved accordingly.

4) The antenna can be constructed such that the width of its conducting strips (in a top view of the antenna) is very small. This minimizes changes of the surface structure of the additional material layers during lamination.

5) No residue of adhesive or other material that was used in the manufacture of the antenna is left between the metallic elements of the antenna. Such contaminants can therefore not diminish the stability of the connection between the substrate (e.g., polycarbonate) and laminated materials (e.g., polycarbonate), required, for example, for security-related applications. In other words, substrate and materials to be laminated can be joined through lamination with sufficient adhesion that is long-term stable.

Advantageously, the antenna sections can be produced using quite different fabrication techniques, for example metallization with copper, use of conductive pastes and inks, placing wires. This allows a very flexible fabrication commensurate with the requirements for the end product. For example, coating or wire placement techniques can be used. Alternatively or in addition, different antenna sections of one and the same antenna could also be fabricated using different fabrication processes, as long as this is technically feasible and sensible in view of the attainable technical properties of the antenna.

Several methods for producing antenna structures on a substrate are known in the art. Additive techniques can here be differentiated from subtractive techniques.

With a subtractive technique, the antennae are fabricated by "removing" something. The antenna structures are fabricated, for example, by chemically removing locally a metal layer disposed on the substrate, for example, by etching with sulfuric acid. The resulting contaminants are in conflict with a high-quality lamination.

An additive technique refers to a fabrication technique where something is "added" when fabricating the antennae. In a first variant, the antenna structures are fabricated by creating a metallic structure on the substrate. In other words, the antenna structures are fabricated on the substrate in the course of applying a material. In this case, the metallic structure can be produced by coating, in particular plasma coating, sputtering, evacuation, dusting, printing or other methods, for example soldering. In another variant, the antenna is produced by applying or mounting an already existing antenna conductor or an already existing antenna on the substrate. In the wire placement technique, for example, a metal wire is connected to the substrate with a placement device.

According to another embodiment of the invention, the first and/or the at least one second antenna section are produced with an additive fabrication technique. The additive technique is primarily used in the production of a high-quality lamination.

The most suitable additive fabrication method for producing the antennae can be selected according to the requirements for the substrate and antenna material, application of the antenna, etc. Particularly robust antennae can be produced, for example antennae used in passports by employing the additive technique for fabricating the antenna, in particular the wire placement technique, wherein already existing antenna conductors or antennae are applied or mounted on the substrate. However, a particularly flat antennae can be produced by using the modified process, where the antenna structures are produced in the course of applying the material on the substrate, e.g., with a coating or printing process. Larger quantities can also be produced more cost-effectively.

BRIEF DESCRIPTION OF THE DRAWING

Other features and advantages of the present invention will be more readily apparent upon reading the following description of currently preferred exemplified embodiments of the invention with reference to the accompanying drawing, in which FIG. 3 shows a schematic diagram of a substrate bottom surface with connecting surfaces in a top view, FIG. 4 shows a schematic diagram of a substrate bottom surface with connecting surfaces and an antenna section in a top view, and FIG. 5 shows a schematic diagram of a transparent substrate with connecting surfaces, through-platings and antenna sections on the top side and bottom side in a perspective view.

DETAILED DESCRIPTION OF PREFERRED EMBODIMENTS

Figure 1:
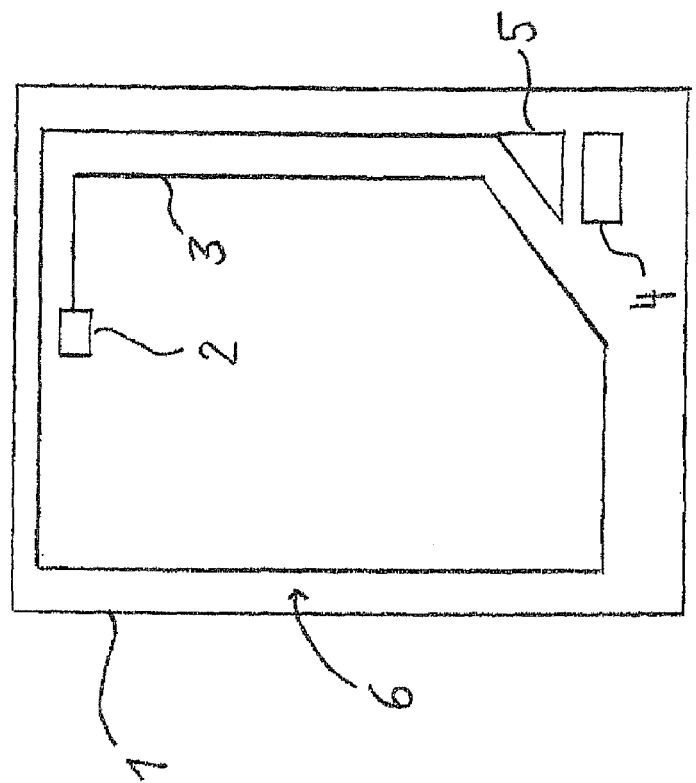
FIG. 1 shows a schematic diagram of a substrate top surface with connecting surfaces in a top view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
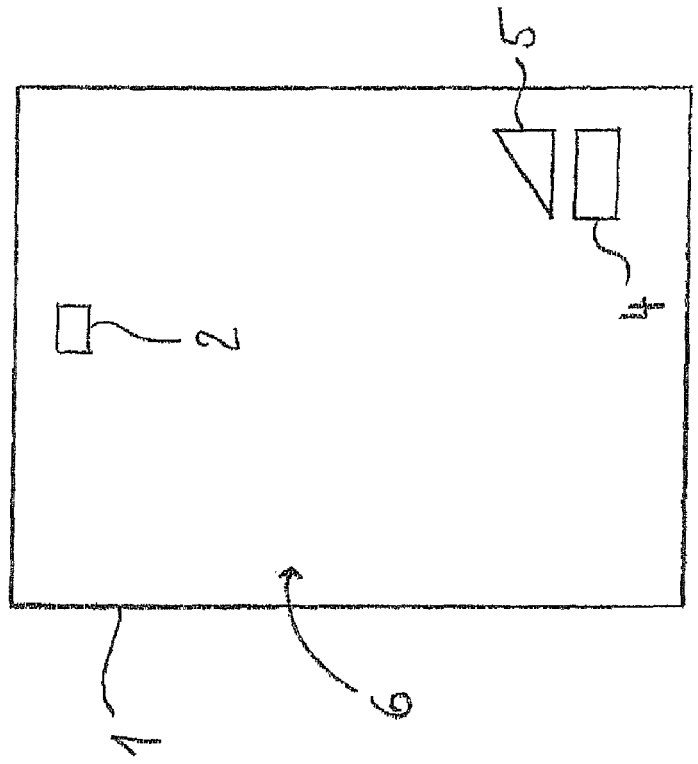
FIG. 2 shows a schematic diagram of a substrate top surface with connecting surfaces and an antenna section in a top view.

Turning now to FIGS. 1 through 4, there are illustrated a series a process steps for fabrication an antenna on a substrate with a chip or chip module, in particular an RFID chip or an RFID chip module, to form a transponder.

A plastic substrate 1 made of polycarbonate undergoes a first process cycle, which includes:

a) producing an electrically conducting connecting surface 2 for connecting an antenna conductor 3, an electrically conducting connecting surface 4 for connecting a chip or chip module (not illustrated) and an electrically conducting connecting surface 5 for connecting a chip or a chip module and an antenna conductor 3 on the first substrate surface, here the substrate top surface 6, as well as producing two electrically conducting connecting surfaces 7, 8 for connecting an antenna conductor 9 on the second substrate surface, here the substrate bottom surface 10, and b) producing an electrically conducting connection 11 between the connecting surface 4 provided for connecting a chip or a chip module on the first substrate surface, here the substrate top surface 6, and one of the two connecting surfaces 7 provided for connecting an antenna conductor 9 on the second substrate surface, here the substrate bottom surface 10, on one hand, and producing an electrically conducting connection 12 between the connecting surface 2 provided form connecting an antenna conductor 3 on the first substrate surface, here the substrate top surface 6, and the other of the two connecting surfaces 8 provided for connecting an antenna conductor 9 on the second substrate surface, here a substrate on a surface 10, on the other hand.

The second process cycle carried out subsequent to the first process cycle includes:

c) producing the first antenna section 3 on the first substrate surface 6, here the substrate top surface 6, d) producing a second antenna section 9 on the second substrate surface, here the substrate bottom surface 10, e) connecting the two section ends of the first antenna section 3 with the connecting surface 2 arranged on the first substrate surface, here substrate top surface 6, provided for connecting an antenna conductor 3, and with the connecting surface 5 for connecting an antenna conductor 3 and a chip or chip module arranged on the first substrate surface, here substrate top surface 6, and f) connecting the two section ends of the second antenna section 9 with the two connecting surfaces 7, 8 arranged on the second substrate surface, here the substrate bottom side 10, provided for connecting antenna conductor 9.

In this way, a complete antenna is produced which is arranged in two non-identical planes and has connecting surfaces for connecting a chip or chip module, wherein the antenna can be combined in a subsequent process step with a chip or chip module, in particular an RFID chip or an RFID chip module, to form a transponder.

The illustrated embodiment (FIG. 5) requires essentially at least two through-platings 11, 12 for connecting the two antenna sections 3, 9. In addition, at least one of the connecting surfaces provided for contacting a chip or chip module is provided with a through-plating 11.

In another embodiment of the invention, the electrically conducting connecting surface 7 for connecting an antenna conductor 9 of the second substrate surface, here the substrate bottom side 10, is produced in a first process cycle so that it can be connected to a chip or a chip module. The first process cycle additionally includes:

a) producing an electrically conducting connecting surface 13 for connecting a chip or chip module on the second substrate surface, here the substrate bottom surface 10, and b) producing an electrically conducting connection 14 between the connecting surface 5 provided for connecting an antenna conductor 3 and a chip or a chip module on the first substrate surface, here the substrate top surface 6, and the connecting surface 13 for connecting a chip or a chip module on the second substrate surface, here the substrate bottom side 10.

In this embodiment, the chip or chip module can be flexibly connected with the substrate, i.e., on either the substrate top side 6 or on the substrate bottom side 10.

In the exemplary embodiments described in the connection with FIGS. 1 to 5, the first substrate surface is located on the substrate top surface 6 and a second substrate surface is located on the substrate bottom surface 10. The conducting connections 11, 12, 14 are through platings through the substrate 1, with the antenna sections 3, 9 being arranged in mutually parallel, spaced-apart planes which correspond to the substrate top side and the substrate bottom side, respectively.

In addition, embodiments of the invention are feasible, where the antenna sections are not arranged in mutually parallel planes and/or where more than two antenna sections are provided. For example, embodiments are feasible where the substrate has a sandwich structure with two superpositioned substrate plates, wherein a first antenna section is disposed on the top side of the uppermost substrate plate, a second antenna section is disposed on the bottom side of the lowermost substrate plate, and a third antenna section is disposed on a substrate surface between the top and the bottom substrate plate.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for producing an antenna for a transponder on a substrate, which also includes a chip or a chip module, the method comprising a first work process comprising the steps of:

a) producing electrically conducting connecting surfaces for connecting an antenna conductor and/or a chip or a chip module, wherein a plurality of first connecting surfaces are produced on a first substrate surface and a plurality of second connecting surfaces are produced on at least one second substrate surface different from the first substrate surface, b) producing a plurality of electrically conducting connections between each of two or more of the first and second connecting surfaces arranged on different ones of the first and second substrate surfaces, the method further comprising a second work process following the first work process, the second work process comprising the steps of:

c) producing a first antenna section on the first substrate surface, d) producing at least one second antenna section on the at least one second substrate surface, e) connecting the first antenna section with at least two first connecting surfaces arranged on the first substrate surface, and f) connecting the second antenna section with at least two second connecting surfaces arranged on the at least one second substrate surface, and g) forming a complete antenna by connecting the first and second antenna sections by way of the plurality of electrically conducting connections, wherein the complete antenna is arranged in at least two non-identical planes and the first and second connecting surfaces are configured for connection to the chip or chip module.

2. The method according to claim 1, wherein the substrate is made of a plastic material.

3. The method according to claim 2, wherein the substrate is made of a polycarbonate material.

4. The method according to claim 1, wherein the first or the at least one second antenna section, or both, are fabricated with an additive fabrication technique.

5. The method according to claim 1, wherein different of the first and the at least one second antenna section are fabricated using different fabrication techniques.

6. The method according to claim 1, wherein the first substrate surface is located on a substrate top surface and the second substrate surface is located on a substrate bottom surface, wherein the plurality of electrically conducting connections are through-platings and the antenna sections are arranged in two mutually parallel, spaced-apart planes.

7. A method for producing an antenna for a transponder on a substrate, which also includes a chip or a chip module, the method comprising a first work process comprising the steps of:

a) producing a first electrically conducting connecting surface for connecting a first antenna conductor, a second electrically conducting connecting surface for connecting a chip or a chip module, and a third electrically conducting connecting surface for connecting a chip or a chip module and a first antenna conductor on a first substrate surface, and producing two electrically conducting fourth connecting surfaces for connecting a second antenna conductor on a second substrate surface, and producing a fifth connecting surface configured for connecting a chip or a chip module on the second substrate surface, b) producing a first electrically conducting connection between the second connecting surface on the first substrate surface and the one of the two fourth connecting surfaces on the second substrate surface, producing a second electrically conducting connection between the first connecting surface and the other of the two fourth connecting surfaces, and producing a third electrically conducting connection between the third connecting surface on the first substrate surface and the fifth electrically conducting connecting surface, the method further comprising a second work process following the first work process, the second work process comprising the steps of:

c) producing a first antenna section on the first substrate surface, d) producing at least one second antenna section on the at least one second substrate surface, e) connecting the first antenna section with the first connecting surface and with the third connecting surface, f) connecting the second antenna section with the two fourth connecting surfaces, and g) forming a complete antenna by connecting the first and second antenna sections by way of the first and second electrically conducting connections.

8. The method according to claim 7, wherein the first substrate surface is located on a substrate top surface and the second substrate surface is located on a substrate bottom surface, wherein the first, second and third electrically conducting connections are through-platings and the antenna sections are arranged in two mutually parallel, spaced-apart planes.

9. The method according to claim 7, wherein the substrate is made of a plastic material.

10. The method according to claim 9, wherein the substrate is made of a polycarbonate material.

\* \* \* \* \*